United States Patent [19]

Harris et al.

[11] Patent Number: 5,208,700
[45] Date of Patent: May 4, 1993

[54] LENS COVER ASSEMBLY FOR BINARY DIFFRACTIVE OPTIC LENSES

[75] Inventors: Ellis D. Harris, Claremont; Steven A. Buhler, Redondo Beach, both of Calif.

[73] Assignee: Xerox Corporation, Stamford, Conn.

[21] Appl. No.: 812,296

[22] Filed: Dec. 23, 1991

[51] Int. Cl.⁵ .............................................. G02B 27/42
[52] U.S. Cl. ................................... 359/569; 359/558; 359/742
[58] Field of Search ............... 359/558, 569, 570, 574, 359/619, 742, 743

[56] References Cited

U.S. PATENT DOCUMENTS

| | | | |
|---|---|---|---|
| 3,827,798 | 8/1974 | Alvarez | 359/742 |
| 4,146,306 | 3/1979 | Wallach | 359/743 |
| 4,190,321 | 2/1980 | Dorer et al. | 359/742 |
| 4,591,256 | 5/1986 | Matsumura | 359/572 |
| 4,787,690 | 11/1988 | Maerz | 359/569 |
| 4,813,762 | 3/1989 | Leger et al. | 359/565 |
| 4,828,558 | 5/1989 | Kelman | 351/171 |
| 4,846,552 | 7/1989 | Veldkamp et al. | 359/572 |
| 4,983,002 | 1/1991 | Shikama et al. | 359/562 |
| 4,994,664 | 2/1991 | Veldkamp | 359/565 |
| 5,104,212 | 4/1992 | Taboury et al. | 351/160 H |

Primary Examiner—Bruce Y. Arnold
Assistant Examiner—J. P. Ryan
Attorney, Agent, or Firm—William Propp

[57] ABSTRACT

A plurality of binary diffractive optic lenses are formed within a corresponding plurality of recesses in the surface of one substrate. The substrate with the binary diffractive optic lenses in the recess are bonded to another flat substrate. A plurality of individual binary diffractive optic lens cover assemblies are obtained by dicing the two bonded substrates.

13 Claims, 4 Drawing Sheets

LENS COVER ASSEMBLY FOR BINARY DIFFRACTIVE OPTIC LENSES

BACKGROUND OF THE INVENTION

This invention relates to a lens cover assembly, and, more particularly, to a lens cover assembly for binary diffractive optic lenses.

Binary diffractive optic lenses are formed by etching or molding very shallow and precise steps or grooves into the surface of a transparent optical elements. Binary diffractive optic lenses present substantial cost savings over conventional precision glass or plastic optical lenses.

However, binary diffractive optic lenses are susceptible to dirt, oil films from handling and loose particles, all of which can interfere optically with the lens. A major concern with binary diffractive optic lenses is protection of the patterned surface of the lenses.

A binary diffractive optic lens can be cleaned by conventional means such as cleansing solutions of alcohol, glycerin or water. However, these conventional cleansing means may be difficult since the surface of the binary diffractive optical lens is not flat but has microscopic grooves which must be cleaned.

Indeed, conventional cleaning means may cause problems in cleaning binary diffractive optic lenses by damaging the grooves which would interfere with operation of the lens, or by leaving remnants of the cleaning within the grooves which also would interfere with operation of the lens.

It is an object of this invention to provide a novel means to protect binary diffractive optic lenses without interfering with operation of the lenses.

It is another object of this invention to provide a lens cover assembly for binary diffractive optic lens that is more cost effective to manufacture by allowing the concurrent fabrication of large quantities of lens cover assemblies for binary diffractive optic lenses from two substrates.

It is yet another object of this invention to provide a lens cover assembly for a binary diffractive optic lens composed of two substrates which are aligned with each other and bonded together.

SUMMARY OF THE INVENTION

In accordance with the present invention, a plurality of binary diffractive optic lenses are formed within a corresponding plurality of recesses in the surface of one substrate. The substrate with the binary diffractive optic lenses in the recess are bonded to another flat substrate. A plurality of individual binary diffractive optic lens cover assemblies are obtained by dicing the two bonded substrates.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
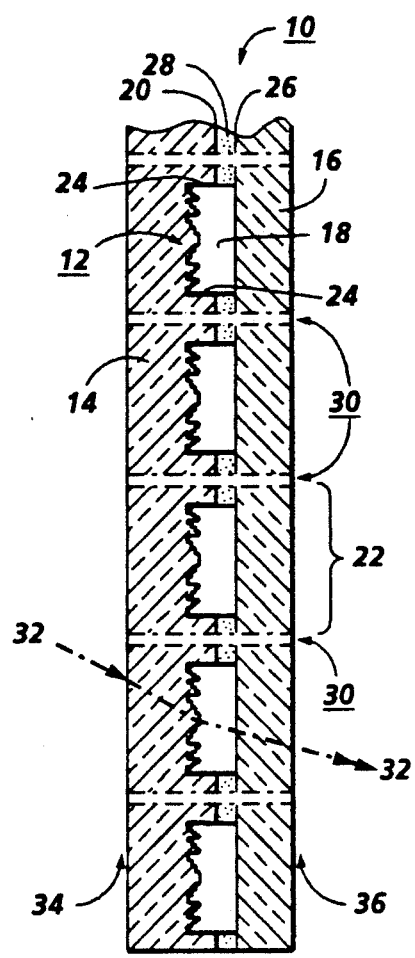
FIG. 1 is a schematic illustration of the cross-section side view of the lens cover assembly for binary diffractive optic lenses formed according to the present invention.

Reference is now made to FIG. 1, wherein there is illustrated a lens cover assembly 10 for a binary diffractive optic lens 12 of this invention.

The substrate 14, upon which the binary diffractive optic lens 12 is formed, is typically fused silica (artificial quartz). The substrate may be glass, quartz, germanium, silicon, or any material that will transmit light in the desired wavelength. The material must be able to take the pattern for the binary diffractive optic lens 12.

The lens cover substrate 16 is also typically fused silica (artificial quartz). The substrate may also be glass, quartz, germanium, silicon, or any material that will transmit light in the desired wavelength. The binary diffractive optic lens substrate 14 and the lens cover substrate 16 need not be of the same material.

The binary diffractive optic lens 12 can be formed on the substrate 14 by conventional photolithographic etching. In general, the etching process involves coating the substantially flat substrate 14 with a photoresist layer, exposing the photoresist layer through a mask with the binary diffractive optic lens pattern, developing the photoresist layer and etching the substrate deep enough to form the binary diffractive optic lens pattern 12 within a recess 18 in the binary diffractive optic lens substrate 14.

The lens cover assemblies 10 are fabricated from the two substrates 14 and 16. A plurality of binary diffractive optic lenses 12 in recesses 18 have been fabricated on the interior surface 20 of the binary diffractive optic lens substrate 14. The binary diffractive optic lens substrate 14 is bonded to the lens cover substrate 16. A plurality of individual binary diffractive optic lens cover assemblies 22 are obtained by dicing the two bonded substrates.

In the preferred embodiment, all the etching is done from one surface of one substrate. The interior surface 20 of the binary diffractive optic lens substrate 14 is chemically cleaned and polished. On the surface 20 of the substrate 14, a mask for a plurality of binary diffractive optic lenses is printed on the surface 20 of the binary diffractive optic lens substrate 14 using a conventional photolithographic photoresist. The non-masked areas on the surface 20 of the substrate 14 are etched by reactive ion etching to fabricate the grooves or steps of the binary diffractive optic lenses 12. The etching of the binary diffractive optic lenses 12 is deep enough to form edge side walls 24 in the substrate surrounding the binary diffractive optic lenses 12. These surrounding edge side walls 24 form a recess 18 approximately 5 microns or greater deep within the substrate 14 from the now raised interior surface 20 of the substrate to the binary diffractive optic lens 12.

The reactive ion etching takes about 45 to 60 minutes to etch the binary diffractive optic lenses 12 in the deep recesses 18 of the binary diffractive optic lens substrate 14. The recesses 18 are etched to only as great a depth as necessary for bonding the substrates 14 and 16 together. A greater depth of etching than necessary for bonding may induce non-uniformity of the recess. The etching depth depends upon the surface area of the substrate exposed to the etchant. Many substrates can be processed simultaneously. The remaining photoresist is removed after etching.

The interior surface 26 of the lens cover substrate 16 should be generally flat or plano. The surface functions as the lens cover without the need to be patterned, etched or molded. The edge side walls 24 of the recess 18 in the binary diffractive optic lens substrate 14 separate the binary diffractive optic lens substrate 14 and the lens cover substrate 16 with the recess 18 between the two substrates.

The edge side walls 24 of the recess 18 in the binary diffractive optic lens substrate 14 need to be rigid to support the binary diffractive optic lens substrate 14 and the lens cover substrate 16 apart and of uniform thickness to provide uniform spacing between the binary diffractive optic lens substrate and the lens cover substrate.

The interior surface 20 of the binary diffractive optic lens substrate 14 and the interior surface 26 of the lens cover substrate 16 serve as the bonding area for bonding the two substrates together, one substrate 14 having the plurality of the binary diffractive optic lenses 12 within recesses 18. A coating 28 of adhesive, such as an epoxy resin, is applied to the raised interior surface 20 of the binary diffractive optic lens substrate 14 in such a manner that it does not run or spread into the recesses 18 of the lens cover. Then, the two substrates are placed together to form a lens cover assembly 10.

The means 28 of bonding the two substrates together is typically by epoxy resin. The epoxy resin bond is approximately 2 microns thick.

Certain thermal setting epoxy resins may require heat curing. Materials for the binary diffractive optic lens substrate and the lens cover substrate must be selected which would not be effected by the heat curing temperature.

Ultraviolet setting epoxy resin is faster to set while thermal setting epoxy resin is better for setting batches.

The bonding means 28 need not be transmissive to the incident light beam. The binary diffractive optic lens 12 in the recess 18 and the substrates 14 and 16 are light transmissive while the non-transmissive bonding means could serve to absorb incident light. Thus, the only light transmitted through the lens cover assembly would be the light focussed by the binary diffractive optic lens 12. The absorbtive bonding means would prevent transmission of extraneous light through the lens cover assembly.

The binary diffractive optic lens substrate 14 can be bonded to any portion of the lens cover substrate 16. While not necessary, alignment markings can be used to align the binary diffractive optic lens in the corresponding recess with the lens cover substrate. At least two alignment markings can be photolithographically produced at predetermined locations on one or both of the substrates. Alignment markings or opening can be made by other conventional means.

The two substrates 14 and 16 are mated and tacked together by partial curing of the adhesive 28. Alternately, the binary diffractive optic lens substrate 14 and the lens cover substrate 16 can be given precisely diced edges and then manually or automatically aligned in a precision jig. The two substrates are cured in an oven or a laminator to permanently bond them together and then the bonded substrate 10 is milled or diced along lines 30 to produce the individual lens cover assemblies 22 with binary diffractive optic lenses.

The incident light beam 32 passes through the binary diffractive optic lens substrate 14, is diffracted by the binary diffractive optic lens 12, passes through the recess 18, and passes through and exits the lens cover substrate 16.

Several advantages are obtained by this fabrication approach. The microfabrication of the lens cover assemblies batches by reactive ion etching is inexpensive. The binary diffractive optic lens are formed within the recesses. The binary diffractive optic lens substrate can be bonded to any portion of the lens cover substrate. One major advantage is that batch processing is practical in simultaneously etching and fabricating large numbers of lens cover assemblies for binary diffractive optic lenses. The orientation dependent etching has been shown to be a high yielding fabrication process for precise, miniature binary diffractive optic lens and cover assembly.

A possible photoresist layer is KTl 820 having a thickness of about 0.5 to 10 microns spin coated on the surface of the substrate. The masking and etching may be made by electron beam lithography or by chemical ion etching or by ion bombardment or by UV lithography.

An alternate method of forming the binary diffractive optic lens on the substrate is by a conventional molding process. In general, the molding process involves pressing a mold with the negative of the binary diffractive optic lens pattern in a recess into a substantially flat, soft coating, such as a plastic or polymer or other organic material, on a hard substrate forming the binary diffractive optic lens pattern in the coating. The mold is typically nickel.

The coating must be able to be mold pressed, be optically transmissive, be thick enough to form the binary diffractive lens in a recess and be able to retain the binary diffractive optic lens pattern in the recess so that the lens will operate optically. The hard substrate is typically fused silica (artificial quartz). The substrate may also be glass, quartz, germanium, silicon, or any material that will transmit light in the desired wavelength.

The interior surface 20 of the binary diffractive optic lens substrate 14 including the binary diffractive optic lens 12 within a recess 18 and the interior surface 26 of the lens cover substrate 16 can be coated with an antireflective coating to improve transmission of light beams.

The exterior surface 34 of the binary diffractive optic lens substrate 14 and the exterior surface 36 of the lens cover substrate 16 can also be coated with an antireflective coating to improve transmission of light beams.

After the bonding of the binary diffractive optic lens substrate 14 and the lens cover substrate 16, the array of lens cover assemblies 10 is diced into separate individual lens and cover assemblies 22 along lines 30. Separation of the lens cover assemblies can be done by sawing with a diamond saw. Any debris created by the sawing could be easily removed and would not present a problem to the optical operation of the binary diffractive optic lens since the binary diffractive optic lens is already enclosed and protected within the recess of the lens cover assembly.

Separation of the lens cover assemblies by laser cutting tends to be difficult since light beams, even concentrated laser beams, typically pass through the fused silica of the binary diffractive optic lens substrate and lens cover substrate.

Figure 2:
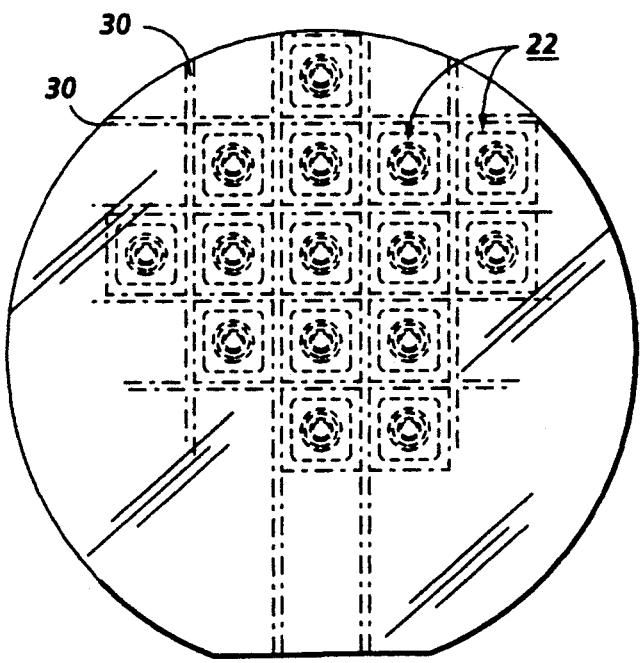
FIG. 2 is a schematic illustration of the top view of the lens cover assembly for binary diffractive optic lenses of FIG. 1 formed according to the present invention.

A plurality of binary diffractive optic lenses within a corresponding plurality of recesses form a plurality of the lens cover assemblies 22 for binary diffractive optic lenses, as shown in FIG. 2.

In fabricating multiple or batch lens cover assemblies for binary diffractive optic lenses, the individual binary diffractive optic lenses may have different diffractive patterns or be of different sizes and shapes from the other binary diffractive optic lens in the batch on the same substrate. The dicing along lines 30 will separate out the individual lens cover assemblies.

The lens cover substrate can be tightly bonded to the binary diffractive optic lens substrate to withstand temperature or pressure changes with air or inert gas or vacuum in the recess between the lens cover wafer and the binary diffractive optic lens wafer.

Alternately, a pinhole breather hole can be fabricated between the outside ambient atmosphere and the recess between the lens cover wafer and the binary diffractive optic lens wafer to equalize the pressure and temperature between the two regions. The breather hole should be located in the lens cover assembly so as to not interfere optically with the incident or output light beam nor with the operation of the binary diffractive optic lens.

Figure 3A:
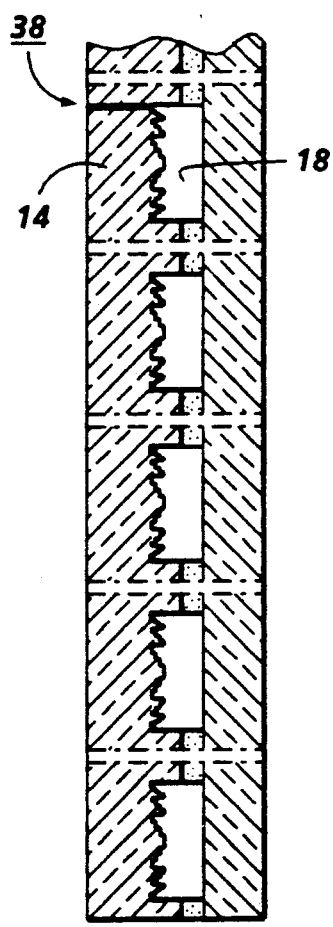
FIGS. 3a, 3b and 3c are schematic illustrations of the cross-section side views of alternate embodiments of a lens cover assembly for binary diffractive optic lenses with a breather hole formed according to the present invention.
Figure 3B:
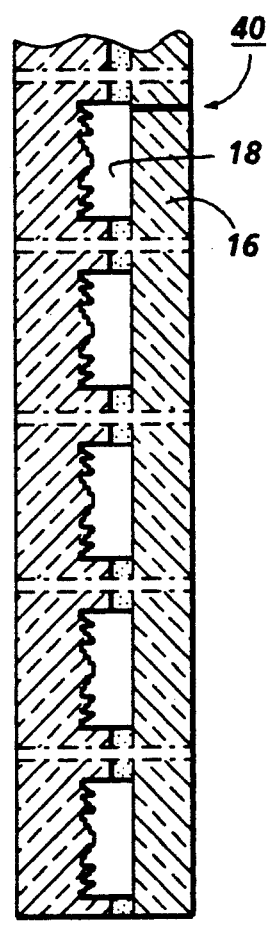
Figure 3C:
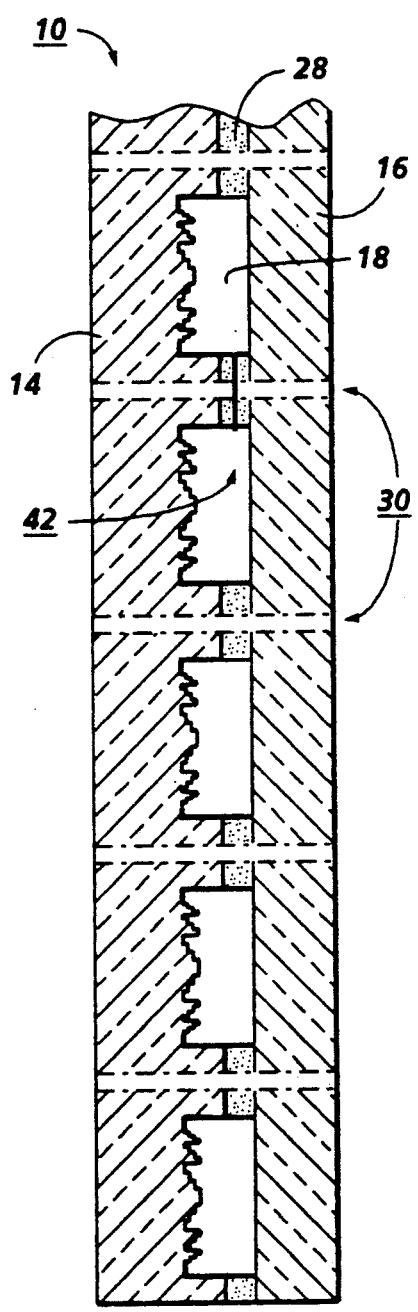

As shown in FIG. 3a, the breather hole 38 can extend through the binary diffractive optic lens substrate 14 to the recess 18. As shown in FIG. 3b, the breather hole 40 can extend through the lens cover substrate 16 to the recess 18. And, as shown in FIG. 3c, the breather hole 42 can extend through the bond 28 between the lens cover substrate 16 and the binary diffractive optic lens substrate 14 to the recess 18. When the lens cover assembly 10 of FIG. 3c is separated by dicing through line 30, the breather hole 42 is revealed and operational.

The photolithographic or nickel molding pattern used in initially forming the binary diffractive optic lens substrate 14 of FIG. 3a or a photolithographic or molding pattern can be used in the lens cover substrate 16 of FIG. 3b or either the binary diffractive optic lens substrate 14 or the lens cover substrate 16 of FIG. 3c can be used to fabricate the breather hole. Alternately, the breather hole can be formed by conventional etching methods in a separate step.

The breather hole also allows solvents used in the forming of the interior patterned surfaces of the binary diffractive optic lens wafer and the lens cover wafer forming the recess to evaporate into the outside ambient atmosphere without leaving residue to possibly interfere with the optical operation of the binary diffractive optic lens.

Figure 4:
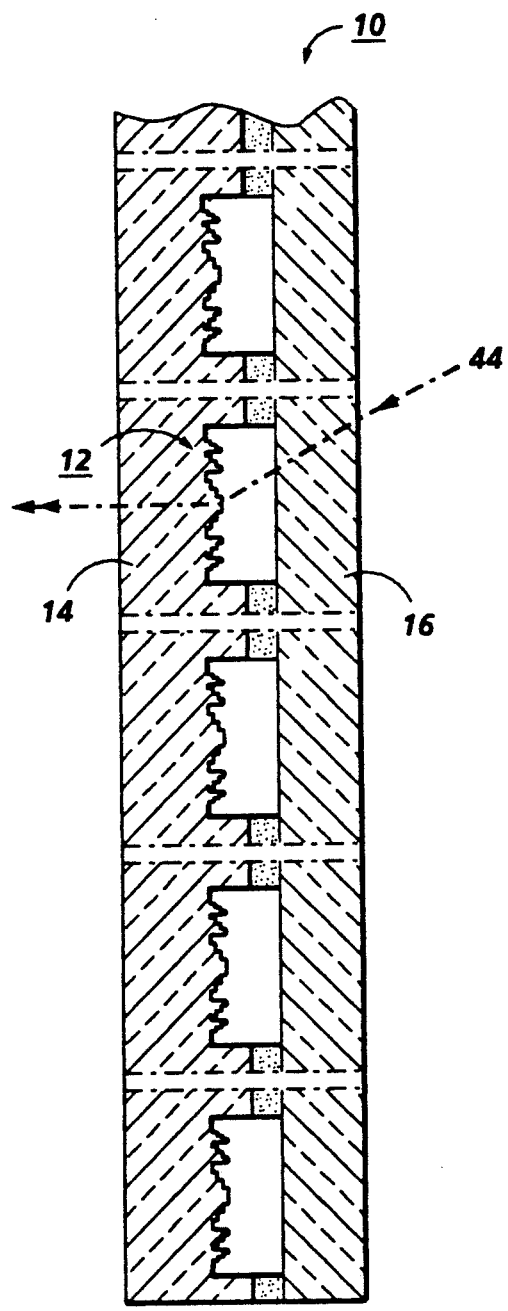
FIG. 4 is a schematic illustration of the cross-section side view of the lens cover assembly for binary diffractive optic lenses with an incident light path through the lens cover formed according to the present invention.

In an alternate light path, as shown in FIG. 4, the incident light beam 44 passes through the lens cover substrate 16, through the recess 18, is diffracted by the binary diffractive optic lens 12, passes through and exits the binary diffractive optic lens substrate 14.

Figure 5:
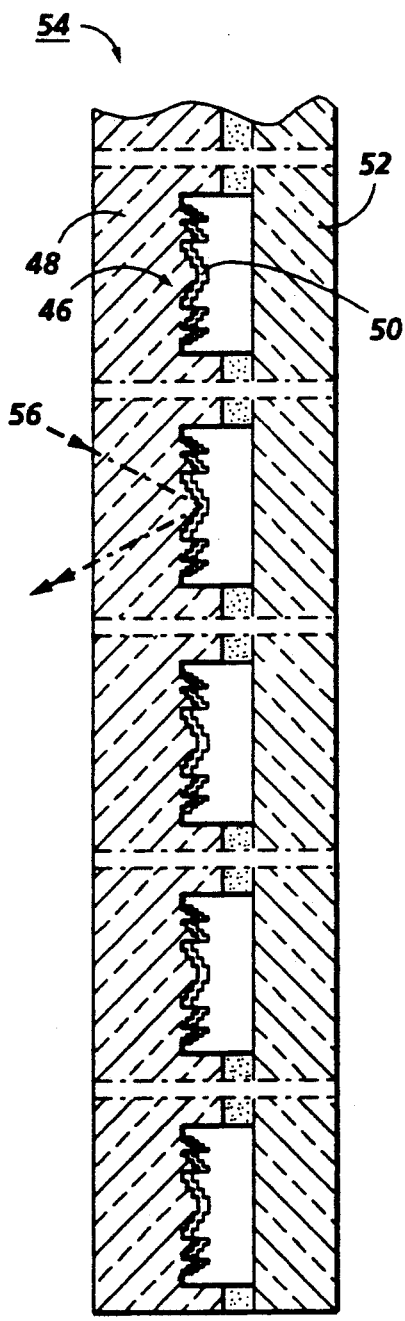
FIG. 5 is a schematic illustration of the cross-section side view of an alternate embodiment of a lens cover assembly for binary diffractive optic lenses with reflective coating formed according to the present invention.

The binary diffractive optic lens can be reflective, rather than transmissive, of the incident light beam. After the binary diffractive optic lens 46 is fabricated on the lens substrate 48 in FIG. 5, the optic lens pattern is coated with a reflective coating 50. Reflective coatings are commercially available. The binary diffractive optic lens substrate 48 is then bonded with the lens cover substrate 52 to form the lens cover assembly 54.

The incident light beam 56 passes through the binary diffractive optic lens substrate 48, is diffracted by the binary diffractive optic lens 46, reflected by the reflective coating 50 on the binary diffractive optic lens, passes through and exits the binary diffractive optic lens substrate 48. The incident and output light beams do not pass through the lens cover substrate.

As previously stated, the binary diffractive optic lens substrate and the lens cover substrate need not be the same material. The lens cover substrate 52 of the lens cover assembly 54 of FIG. 5 need not be fabricated from a material which is optically transmissive to the light beam. The reflective coating 50 need not have a uniform thickness on the binary diffractive optic lens since the light is reflected from the intersection of the binary diffractive optic lens of the substrate and the reflective coating.

After the binary diffractive optic lens 58 is fabricated on the lens substrate 60 in FIG. 7, the optic lens pattern is coated with a reflective coating 62. Reflective coatings are commercially available. The binary diffractive optic lens substrate 60 is then bonded with the lens cover substrate 64 to form the lens cover assembly 66.

The incident light beam 68 passes through the lens cover substrate 64, through the recess 70, is diffracted and reflected coating 62 on the binary diffractive optic lens 58, passes through the recess 70 and passes through and exits the lens cover substrate 64. The incident and output light beams do not pass through the binary diffractive optic lens substrate.

Figure 6:
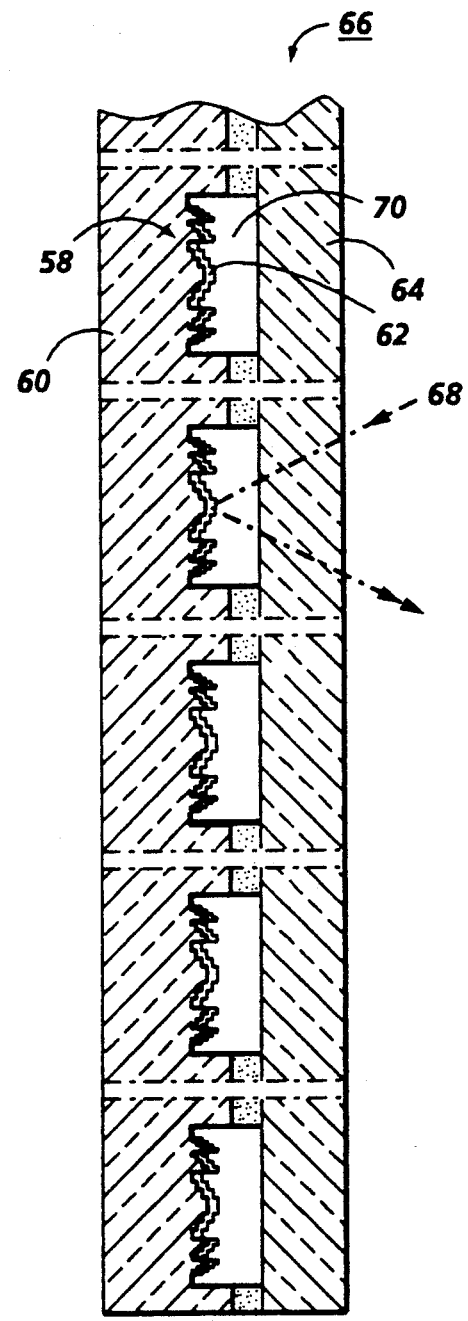
FIG. 6 is a schematic illustration of the cross-section side view of an alternate embodiment of a lens cover assembly for binary diffractive optic lenses with reflective coating with an incident light path through the lens cover formed according to the present invention.

As previously stated, the binary diffractive optic lens substrate 60 and the lens cover substrate 64 need not be the same material. The binary diffractive optic lens substrate of the lens cover assembly of FIG. 6 need not be fabricated from a material which is optically transmissive to the light beam. The reflective coating 62 must have a uniform thickness on the binary diffractive optic lens since the light is reflected from the intersection of the reflective coating on the binary diffractive optic lens and the recess.

The lens cover substrate can be any lens, grating, plastic surface, semiconductor surface, glass surface or any other surface. This lens cover assembly can be used to protect compound lenses which are bonded together, or combinations of lenses, apertures, or gratings which are bonded together.

Depending upon the choice of materials for the binary diffractive optic lens substrate and the lens cover substrate, and the pattern of the binary diffractive optic lens, the lens cover assembly will allow the binary diffractive optic lens to diffract any wavelength of light in the ultraviolet, visible, or infrared spectrum.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A lens cover assembly for binary diffractive optic lenses comprising:
   a first substrate having a plurality of binary diffractive optic lenses within a corresponding plurality of recesses on one surface of said first substrate,
   a second substrate, and
   bonding means for securing said first and second substrates together to form a lens cover assembly from the combination of one of said binary diffractive optic lens and one of said recesses.

2. The lens cover assembly for binary diffractive optic lenses of claim 1 wherein said bonded first and second substrates form individual lens cover assemblies from the combination of one of said binary diffractive optic lens and one of said recesses.

3. The lens cover assembly for binary diffractive optic lenses of claim 1 wherein said one surface of said first substrate and one surface of said second substrate forming said recess are coated with an antireflective coating.

4. The lens cover assembly for binary diffractive optic lenses of claim 1 wherein said plurality of said binary diffractive optic lenses are coated with a reflective coating.

5. The lens cover assembly for binary diffractive optic lenses of claim 4 wherein said reflective coating has a uniform thickness on said plurality of said binary diffractive optic lenses.

6. The lens cover assembly for binary diffractive optic lenses of claim 1 wherein said bonding means is light absorbtive.

7. The lens cover assembly for binary diffractive optic lenses of claim 1 wherein said plurality of binary diffractive optic lenses have at least two different diffractive patterns.

8. The lens cover assembly for binary diffractive optic lenses of claim 1 wherein a breather hole extends through said first substrate to said recess of said lens cover assembly.

9. The lens cover assembly for binary diffractive optic lenses of claim 1 wherein a breather hole extends through said second substrate to said recess of said lens cover assembly.

10. The lens cover assembly for binary diffractive optic lenses of claim 1 wherein a breather hole extends through said bonding means to said recess of said lens cover assembly.

11. The lens cover assembly for binary diffractive optic lenses of claim 1 wherein said binary diffractive optic lenses on said first substrate are formed by photolithography.

12. The lens cover assembly for binary diffractive optic lenses of claim 1 wherein said binary diffractive optic lenses on said first substrate are formed by molding.

13. The lens cover assembly for binary diffractive optic lenses of claim 1 wherein said bonding means are an epoxy resin.

* * * * *